Patented Apr. 3, 1934

1,953,734

UNITED STATES PATENT OFFICE

1,953,734

PROCESS FOR THE PREPARATION OF CURDS (CASEIN), FRESH CHEESE AND RENNET CHEESES FROM CREAM, WHOLE MILK, OR SKIM MILK

Arbogast von Plawenn, Frankfort-on-the-Main, and Gustav Kersten, Grebenstein, near Cassel, Germany, assignors, by mesne assignments, to Robert Feix and Emmy Scheinberger, both of Frankfort-on-the-Main, Germany No Drawing. Application May 3, 1933, Serial No. 669,196. In Germany March 6, 1933

5 Claims. (Cl. 99—11)

This invention relates to a process for the preparation of curds (casein), fresh cheese and rennet cheeses from cream, whole milk or skim milk.

The method hitherto adopted for preparing such cheeses has been to separate the casein from the whey with the aid of rennet-ferment or lactic acid formation and thereafter to express the casein. The operation in this known method is effected at temperatures of from 28 to 35° C. and the product obtained, owing to the application of such high temperatures, has the disadvantage that the separation was effected at a degree of acidity equivalent to 28 to 35° Soxhlet-Henkel. This has, however, the attendant disadvantage that the high acid content of the product renders strong neutralization necessary in the further processes of working up, such neutralization being, as a rule, effected by adding sodium carbonate. A further disadvantage of the process of preparation hitherto adopted resides in the fact that with certain kinds of unsalted fresh cheese an undesirable bitter and acid taste develops even after only 4 to 5 days, the product being rendered unsalable thereby.

The hereinafter described process has various advantages over the method of preparation hitherto adopted. The most important improvement obtained is that the durability of fresh cheeses is substantially increased and their taste considerably improved. In the case of rennet cheeses the desired lard-like cutting qualities are obtained in accordance with the process of this invention. The proportionate yields are, moreover, considerably increased and in many cases the process of preparation of the individual kinds of cheese is also considerably simplified.

In the German patent specification No. 555,273 and its patent of addition No. 558,702 the action of pectin on milk is disclosed. It is stated in these two patent specifications that separation of the serum from a milk concentrate can be effected by adding small quantities of pectin to the milk.

Experiments based on the knowledge disclosed in the two patent specifications have been carried out by us with a view to amalgamating the actions of rennet ferment and pectin in the preparation of various kinds of cheeses. It was found in the course of these experiments that in such a method of preparation the quantity of the rennet ferment and, above all, the temperature of the enzyme process can be very considerably reduced.

The process for the preparation of curds (casein), fresh cheese and rennet cheeses from cream, whole milk or skim milk according to this invention is based on the results obtained in the afore-mentioned experiments and consists in simultaneously treating the said cream, whole milk or skim milk with pectin in liquid or dry form and rennet, expressing the resulting curd and further treating the same in known manner.

Whereas in a pure rennet process temperatures of at least 28 to 35° C. must be employed, in order to coagulate the albumin, temperatures of 10 to 16° C. suffice when employing rennet and pectin together. This lowering of the requisite temperature has far-reaching effects. At 28 to 35° C., i. e. temperatures which can almost be reached in an incubator, not only does the rennet ferment act, but other biological processes also take place, particularly the development of micro-organisms, which subsequently have a further effect on the cheese produced. It is, furthermore, due to these micro-organisms that a curd cheese or fresh cream cheese prepared with rennet and lactic acid alone assumes within a few days a strongly acid and bitter taste, which renders it unpalatable.

If, however, in accordance with the process of this invention rennet and pectin are employed in conjunction and temperatures of from 10 to 16° C. are not exceeded, the development of the harmful micro-organisms is to a considerable extent checked and may be even entirely arrested. It is attributable to this circumstance that a curd or fresh cream cheese produced in this way can be kept for many days longer than ordinary fresh cheese. The usual acid and bitter taste does not develop at all, but only normal ripening of the cheese takes place.

In addition to the foregoing, however, the curd or fresh cream cheese prepared in accordance with this invention with rennet and pectin acquires a structure or texture, which likewise has an effect on the taste, since the extraordinarily fine gel-like quality of the resulting curd remains even in the expressed condition and imparts to the curd- or fresh-cream cheese a viscid, absolutely smooth and extraordinarily fine taste. The fresh cheeses prepared in this way are equal to the expensive Gervais cheeses or fine cream cheeses.

Example of the preparation of a fresh cheese:

50 litres of skim milk, whole milk or cream (if desired mixed) are stirred with 0.5 to 3% of a 10% pectin extract. ½ litre of milk, which has turned acid, is mixed with ½ g of rennet ferment and added thereto. The milk is then allowed to coagulate at a temperature of from 10 to 16° C.

(depending upon the time of year) until the curd has reached a degree of acidity corresponding to 16° Soxhlet-Henkel. The further treatment is exactly the same as in the ordinary casein preparation, the curd is comminuted, pressed in cloths and the product packed for sale.

The addition of pectin thus enables substantially lower temperatures to be employed. In addition a very clear, easily drainable whey is obtained and the coagulation of the curd takes place, when the acidity is maintained within the correct limits, several hours earlier, and with the production of a more solid casein more favourable for the ripening of rennet cheese, than when employing rennet alone.

It is also to be remarked that the whey obtained at lower temperatures with the addition of pectin can be technically worked up into milk sugar and baking ingredients, although the curd or fresh cheese has been removed from the milk in an acid condition. In the preparation of pure rennet cheese also, the curdling temperature of which can likewise be reduced to 10° C., the development of lactic acid in the whey produced is considerably diminished.

The different kinds of cheese obtained by the combined use of rennet ferment and pectin, such as curd cheese, whole milk cheese, cream cheese and rennet cheese, have an extraordinarily fine-grained structure or texture and a very smooth almost melting taste. The fresh cheeses can be kept for an extraordinarily long time, without acquiring an acid or bitter taste. The cheeses prepared by the rennet-pectin process are far superior in every way to those obtained with rennet alone. The new process, as stated above, ensures considerably higher yields.

It should be noted that the amount of rennet added can be still further diminished and the amount of pectin added be further increased or diminished. The figures indicated are merely examples and the process is not limited thereto. Similarly the process is not limited to the use of a pectin extract but any desired pectin powders may be employed in the form of solutions or be directly admixed as such.

What we claim is:—

1. A process for the preparation of curds (casein), fresh cheese and rennet cheeses from cream, whole milk or skim milk, which comprises simultaneously treating the said cream, whole milk or skim milk with pectin and rennet, expressing the resulting curd and further treating the same in any suitable manner.

2. A process for the preparation of curds (casein), fresh cheese and rennet cheeses from cream, whole milk or skim milk, which comprises simultaneously treating the said cream, whole milk or skim milk with pectin and rennet at temperatures of from 10 to 16° C., expressing the resulting curd and further treating the same in any suitable manner.

3. A process for the preparation of curds (casein), fresh cheese and rennet cheeses from cream, whole milk or skim milk, which comprises simultaneously treating the said cream, whole milk of skim milk with 0,5 to 3% of a 10% pectin extract and rennet at temperatures of from 10 to 16° C., expressing the resulting curd and further treating the same in any suitable manner.

4. A process for the preparation of curds (casein), fresh cheese and rennet cheeses from cream, whole milk or skim milk, which comprises simultaneously treating the said cream, whole milk or skim milk with pectin in liquid form and rennet, expressing the resulting curd and further treating the same in any suitable manner.

5. A process for the preparation of curds (casein), fresh cheese and rennet cheeses from cream, whole milk or skim milk, which comprises simultaneously treating the said cream, whole milk or skim milk with pectin in liquid form and rennet at temperatures of from 10 to 16° C., expressing the resulting curd and further treating the same in any suitable manner.

ARBOGAST v. PLAWENN.
GUSTAV KERSTEN.